United States Patent Office 2,842,507
Patented July 8, 1958

2,842,507
PROCESS FOR PREPARING IMPROVED ASPHALT

Kenneth G. Morris, Cranford, Joseph C. Roediger, Westfield, Raymond G. Newberg, Roselle Park, and Andrew F. Sayko, Westfield, N. J., assignors to Esso Research and Engineering Company, a corporation of Delaware No Drawing. Application March 7, 1955
Serial No. 492,771

5 Claims. (Cl. 260—28.5)

The present invention is concerned with an improved process for the preparation of high quality petroleum asphalts. The invention more particularly relates to an improved asphalt composition prepared by air blowing a petroleum asphalt in the presence of a phosphorus oxide catalyst and a particular type of high molecular weight hydrocarbon polymer. In accordance with the present invention a high quality asphalt suitable as a paper laminant, crack sealer, and the like, is prepared by adding a high molecular weight isobutylene-styrene copolymer and a phosphorus oxide to a suitable asphalt base stock and then oxidizing the mixture to the desired asphalt grade.

The production of oxidized asphalts by blowing air through a petroleum residue or straight run asphalt at elevated temperatures is well known in the art. This technique has a decided effect upon and improves some of the physical properties of the asphalt. In general, this technique serves to improve the temperature susceptibility characteristics. It is to be noted that the hardness of a straight run asphalt may be greatly increased by extensive steam or vacuum distillation of the asphalt, but the resulting product in this instance is generally more susceptible to temperature changes. The air-blowing technique, in comparison with the vacuum distillation method, is capable of producing an asphaltic product of greater pliability but of the same hardness as an asphaltic product produced by vacuum distillation of the same straight run asphalt. As a result of their very desirable hardness, pliability and weathering resistance qualities, oxidized asphalts have become very popular in the production of roofing asphalts, protective coatings, electrical insulating compositions, moulded articles, and the like. In general, oxidized asphalts are available having softening points of about 100° F. to 250° F. or more and penetrations of about 200 down to about 10 (100 g./5 sec./77° F.). By comparison, straight reduced asphalts are generally available possessing softening points of about 100° F. to 170° F. and having penetration values of about 200 down to 10 or 20 (100 g./5 sec./77° F.).

Oxidized asphalts have been used for many years for paper laminants, crack sealers, and a variety of other uses where their high softening point and good temperature susceptibility characteristics are required. By varying the consistency of the oxidation bases, asphalt producers have been able to vary oxidized asphalt properties to meet most of the requirements. Thus, penetration at 77° F., for example, can be varied over a wide range for a given softening point merely by changing the oxidation base. However, while oxidized asphalts show good temperature susceptibility, they are limited in ductility due to their gel type structure.

In connection with the conventional process of air-blowing petroleum asphalts, it has further been found that certain materials may be added to the asphalt being processed which will further modify the physical properties of the final product. For example, it has been established that compounds such as ferric chloride make possible the production of air-blown asphalts having even greater softening points for a given penetration than is possible by air-blowing alone. The use of these materials also usually reduces the period of time required in an air-blowing operation.

In accordance with the present invention an oxidized asphalt is prepared by air-blowing the asphalt in the presence of a phosphorus oxide, as for example $P_2O_5$, and a high molecular weight isobutylene-styrene hydrocarbon copolymer.

Broadly these hydrocarbon polymers are preferably hydrocarbon copolymers of the general class of copolymers of polymerizable hydrocarbon containing a cyclic nucleus, and an aliphatic olefin or alkene, as, for example, a copolymer of styrene and isobutylene. United States Patent No. 2,274,749, issued March 3, 1942, describes copolymers of the general class referred to above, such as copolymers of styrene and isobutylene, and describes preparation thereof by copolymerizing the reactants at temperatures below 0° C. using a Friedel-Crafts halide catalyst such as boron fluoride or aluminum chloride, with or without substances such as propane, ethylene, or chlorinated hydrocarbons as diluents, solvents or refrigerants. By adjusting the proportion of the two raw materials, copolymers of any desired hardness, melting point or elasticity may be obtained. For example, the copolymer may comprise from 10% to 60% of styrene as compared to 90% to 40% by volume of isobutylene.

The following data illustrate how asphalts have been improved appreciably in penetration qualities and slightly in ductility by the use of $P_2O_5$ oxidation catalyst.

TABLE I

| Process | Air Blown at 450–475° F. | Air-blown at 450–475° F. in Presence $P_2O_5$(1.5 wt. Percent) |
|---|---|---|
| Softening Point, ° F. | 180/200 | |
| Penetration, 77° F./100 g./5" | 30–20 | 65–50 |
| Ductility, 77° F., cm | 3–1 | 6–3 |

Asphalts have also been improved in ductility with little change in penetration by the addition of 2% isobutylene-styrene polymer to oxidized asphalt as shown by the following data.

TABLE II

| Process | Air Blown at 450–475° F. Only | Air Blown at 450–475° F. +2 Percent Polymer [1] |
|---|---|---|
| Softening Point, ° F. | 188 | 184 |
| Penetration, 77° F./100 g./5" | 27 | 28 |
| Ductility, 77° F., cm | 3 | 39 |
| Ductility, 39.2° F., cm | 2½ | 4 |

[1] Polymer—50% isobutylene—50% styrene.

Thus the present invention comprises using phosphorus oxide catalysts in conjunction with isobutylene-styrene polymers to yield asphalts having both high penetrations and ductilities, particularly at low temperature conditions. A number of operations were conducted using the process of the present invention with the results as shown in the following table. Products in both the 180/200 and 210/230° F. softening point ranges were prepared.

TABLE III

*Asphalt improvement*

| Operation | 1 | 2 | 3 | 4 | 5 |
|---|---|---|---|---|---|
| Method of Preparation | Straight Oxidation | Flux Blended with 2% Polymer [1] then Oxidation with 1.5% $P_2O_5$ | Straight Oxidation | Flux +1.5% $P_2O_5$ Stirred under $N_2$; then blend in Polymer [1] under $N_2$; then Oxidized | Flux at 430° F., Added 1.6% $P_2O_5$ and 2% Polymer [1] then Oxidized |
| Oxidizing Base | 500° F. Flash Lagunillas Flux | | | | |
| Time, Min. for: | | | | | |
| $P_2O_5$ Heating | | | | 240 | |
| Blending | | 105 | | 120 | 18 |
| Oxidation | 320 | 105 | 450–475 | 80 | 120 |
| Temp., ° F. for: | | | | | |
| $P_2O_5$ Heating | | | | 450 | |
| Blending | | 400 | | 380–425 | 430–450 |
| Oxidation | 450–475 | 450–475 | | 450–475 | 450–475 |
| Inspections: | | | | | |
| Soft. Point, ° F | 188 | 194 | 223 | 218 | 219 |
| Pen. 77° F./100 g./5" | 27 | 100 | 16 | 75 | 82 |
| Pen. 32° F./200 g./60" | 18 | 54 | 8 | 44 | 49 |
| Ductility 77° F. (5 cm./min.), cm | 3 | 46.5 | 2 | 73 | 67 |
| Ductility 39.2° F. (5 cm./min.), cm | 2½ | 82 | | 45 | 51 |

[1] Polymer—50% Isobutylene—50% Styrene.

The foregoing data show that products prepared with $P_2O_5$ catalyst and styrene-isobutylene polymer are much improved in (1) penetrations at 77° F. and 32° F. and (2) ductilities at 77° F. and 39.2° F., as compared with regular oxidized asphalts of the same softening point. As shown by the data in Tables I and II, some improvements in one property or the other at 77° F. can be obtained with $P_2O_5$ or the polymer alone. However, the improvement of all properties, and especially the improvement in the low temperature properties, is very desirable.

It is to be noted that these improved asphalts were prepared by several methods. In one operation the polymer was blended with the oxidizing base before addition of $P_2O_5$ and oxidation to grade. In another operation, $P_2O_5$ and oxidizing base were stirred under $N_2$ to increase the softening point to 117° F.; then the polymer was blended under $N_2$ to take the softening point to 133° F.; and then the blend was oxidized to grade with air. In another operation, both $P_2O_5$ and polymer were added to hot flux and immediately oxidized to grade with air. In all instances the physical properties of the oxidized ashalts were improved.

The temperatures employed for asphalt oxidation are generally in the range from about 400–600° F. with usual operation in the range from about 450–525° F.

While 2% of a polymer (50% isobutylene—50% styrene) was used in the operations illustrated in Tables I, II and III, it is to be understood that other concentrations of polymers as well as different polymers may be employed. For example, the polymer may comprise 40% styrene and 60% isobutylene (designated S–40), or 60% styrene and 40% isobutylene (designated S–60). The

TABLE IV

*Asphalt-polymer products [1]*

| Operation | 6 | 7 | 8 | 9 | 10 | 11 |
|---|---|---|---|---|---|---|
| Product Contains: | | | | | | |
| Percent $P_2O_5$ | 1.6 | 1.6 | 1.6 | 1.6 | 1.6 | 1.6 |
| Percent Polymer | None | 0.5 S–50 | 1.0 S–50 | 2.0 S–50 | 2.0 S–30 | 2.0 S–80 |
| Inspections: | | | | | | |
| Soft. Pt., ° F | 231 | 222 | 228 | 220 | 233 | 210 |
| Pen. 77° F | 78 | 68 | 75 | 83 | 70 | 88 |
| Pen. 32° F | 50 | 55 | 59 | 50 | 45 | 62 |
| Pen. 115° F | 101 | 115 | 115 | 154 | 104 | 142 |
| Duct. 77° F | 4 | 23.5 | 57 | 64 | 23 | 5.5 |
| Duct. 39.2° F | 4.5 | 5.5 | 13.5 | 30 | 14.5 | 6 |

[1] Oxidized at 450–475° F.
S–50—50% styrene—50% isobutylene.
S–30—30% styrene—70% isobutylene.
S–80—80% styrene—20% isobutylene.

concentrations of the polymers employed may be in the range from 0.5% by weight to about 20% by weight.

The data appearing in Table IV illustrate improvements secured when using various polymers as well as various concentrations of polymers.

The air rate used in the oxidation may be varied appreciably as, for example, from 10 to 500 cubic feet per minute per ton. The amount used in the operations listed was 50 cubic feet of air per minute per ton of material being treated.

While $P_2O_5$ was employed in the examples shown in the foregoing tables, it is to be understood that other phosphorous compounds may be used as, for example, $P_4S_3$, $P_4S_7$, $P_2S_5$, red phosphorous and the like.

The amount of phosphorous used may be varied in the range from about 0.1% by weight to 4% by weight. However, it is preferred to use from about 0.5% to about 2% by weight, based upon the asphalt being treated.

What is claimed is:

1. A process for the preparation of an improved asphalt which comprises incorporating from about 0.1 to about 4% by weight of a phosphorous oxide and about 0.5 to about 20% by weight of a high molecular weight copolymer of isobutylene and styrene into a petroleum asphalt and thereafter air-blowing said asphalt.

2. Process as defined by claim 1 wherein said phosphorous oxide comprises $P_2O_5$.

3. Process as defined by claim 1 wherein the temperature employed in the air-blowing is in the range from about 400 to 600° F.

4. Improved process for the preparation of a high quality asphalt which comprises adding to said asphalt from about 0.2% by weight to 4% by weight of a phosphorous oxide and from 0.5 to 4% by weight of a copolymer of isobutylene and styrene and thereafter air-blowing said mixture at a temperature in the range from about 400° F. to about 600° F.

5. Process as defined by claim 4 wherein the phosphorous oxide used is in the range from about 1% to 2% by weight and wherein said phosphorous oxide comprises $P_2O_5$.

References Cited in the file of this patent

UNITED STATES PATENTS 2,714,568    Newberg et al.    Aug. 2, 1955

OTHER REFERENCES

Abraham: "Asphalts and Allied Substances," 4th edition, Van Nostrand, New York (1938), page 443.